United States Patent [19]

Camp, Jr.

[11] Patent Number: 5,262,632
[45] Date of Patent: Nov. 16, 1993

[54] INTEGRATED CIRCUIT FOR ACHIEVING PATTERN RECOGNITION

[75] Inventor: William O. Camp, Jr., Ithaca, N.Y.

[73] Assignee: International Business Machines Corporation, Armonk, N.Y.

[21] Appl. No.: 890,976

[22] Filed: May 29, 1992

[51] Int. Cl.⁵ .............................................. H01J 40/14
[52] U.S. Cl. .................................. 250/208.1; 307/311; 358/213.11
[58] Field of Search ............ 250/213 A, 208.1, 201.6, 250/205, 214 C, 214 A, 214 L, 214 P, 214 AG; 307/311, 328; 358/213.15, 213.11

[56] References Cited

U.S. PATENT DOCUMENTS 4,288,152  9/1981  Matsuda ........................... 250/201.6
4,466,018  8/1984  Soneda et al. .................. 358/213.15
5,153,420  10/1992  Hack et al. ........................ 250/208.1

Primary Examiner—David C. Nelms
Assistant Examiner—Que T. Le
Attorney, Agent, or Firm—Bernard Tiegerman

[57] ABSTRACT

An apparatus for massive computation in integrated circuits provides the ability to calculate multiple dot products between an image focused on the integrated circuit surface and many reference patterns built into the integrated circuit, and then give an output indication for all those reference patterns where the dot product exceeds a threshold. The implementation, using current mirrors for multiplication with fixed constants, permits the integrated circuit to achieve large amounts of computation per unit area. This apparatus permits a large input data bandwidth, and by virtue of having enough computation capacity to complete a processing task on one chip, the output bandwidth is greatly reduced as well. The apparatus is employed, as an example, in a neural network. A set of connections between nodes that modify the value of the signal passed from one node to the next. Often many connections impinge on a node, and the summation of values at the node is further modified by a nonlinear function such as a threshold and amplitude limiter. Values at the input nodes represent the signals to be evaluated by the network, and values at the outputs represent an evaluation by the network of the input signals. For instance, the input could be image pixels and the outputs could represent possible patterns to which the image could be assigned. The connections between weights are often determined and modified by training data, but they can also be prespecified in total or in part based on other information about the task of the network.

16 Claims, 3 Drawing Sheets

ORIENTATION ANGLE = (N − 1) * 30°

N =     1                    2                    3

SPATIAL PHASE SHIFT = +90°

```
0 0 0 0 0 0 0 0      + + + 0 − − − −      − − + + + 0 − −
0 0 0 0 0 0 0 0      + + + + + 0 − −      − − 0 + + + − −
− − − − − − − −      − 0 + + + + 0 −      − − − + + 0 − −
− − − − − − − −      − − 0 + + + + +      0 − − 0 + + + −
+ + + + + + + +      − − − − 0 + + +      0 − − − 0 + 0 −
+ + + + + + + +      0 0 − − − 0 +        0 0 − − − + + +
+ + + + + + + +      0 0 0 − − − − −      0 0 0 − − 0 + +
− − − − − − − −      0 0 0 0 0 − − −      0 0 0 − − − + +
        201                  202                  203
```

SPATIAL PHASE SHIFT = 0°

```
− − − − − − − −      0 − − − − − 0 0      0 + + 0 − − − 0
− − − − − − − −      + 0 − − − − − −      − + + + 0 − − 0
0 0 0 0 0 0 0 0      + + + 0 − − − −      − 0 + + + − − −
+ + + + + + + +      0 + + + + 0 − −      − − + + + 0 − −
+ + + + + + + +      − 0 + + + + 0 −      − − 0 + + + − −
0 0 0 0 0 0 0 0      − − − 0 + + + +      − − − + + + 0 −
− − − − − − − −      − − − − − 0 + +      0 − − 0 + + + −
− − − − − − − −      0 0 − − − − − 0      0 − − − 0 + + 0
        211                  212                  213
```

SPATIAL PHASE SHIFT = −90°

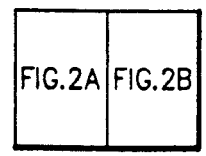

FIG.2

+ = WEIGHT OF +1     − = WEIGHT OF −1

INTEGRATED CIRCUIT FOR ACHIEVING PATTERN RECOGNITION

CROSS REFERENCE TO RELATED APPLICATIONS

The present application related to the following co-pending patent application filed concurrently herewith: U.S. patent application Ser. No. 07/890997, filed May 29, 1992, of W. O. Camp, Jr., entitled "Image Analysis Apparatus".

This co-pending application and the present application are owned by one and the same assignee, International Business Machines Corporation of Armonk, N.Y.

The description set forth in the co-pending application is incorporated into the present application by reference.

FIELD OF THE INVENTION

This invention relates to optical sensors with imbedded processing, and particularly to silicon integrated circuits with photoreceptors and processors which will detect the presence of one of a set of patterns within an image focused on its surface.

GLOSSARY OF TERMS

IC—Integrated circuit. The illustrated integrated circuit includes field effect transistors, bipolar transistors and wiring to connect together many of these elements.

Neural Network—A set of connections between nodes that modify the value of the signal passed from one node to the next. Often many connections impinge on a node, and the summation of values at the node is further modified by a nonlinear function such as a threshold and amplitude limiter. Values at the input nodes represent the signals to be evaluated by the network, and values at the outputs represent an evaluation by the network of the input signals. For instance, the input could be image pixels and the outputs could represent possible patterns to which the image could be assigned. The connections between nodes, sometimes called weights, are often determined and modified by training data, but they can also be prespecified in total or in part based on other information about the task of the network.

PFET—Field Effect Transistor with p-type silicon channel. A three terminal device that conducts current based on the voltage impressed on a third terminal relative to the voltage on the terminal nearest the power supply.

NFET—Field Effect Transistor with n-type silicon channel. A three terminal device that conducts current based on the voltage impressed on a third terminal relative to the voltage on the terminal nearest the supply ground.

Bipolar Transistor—A three terminal device that conducts current based on the current supplied to a third terminal, or, in the case of the phototransistor used in this invention, based on the light level impinging on the active transistor region.

REFERENCES USED IN THE DISCUSSION OF THE INVENTION

During the detailed description which follows the following works will be referenced as an aid for the reader. These additional references are:

1. Mueller, P., et. al., "Design and Fabrication of VLSI Components for a General Purpose Analog Neural Computer," Analog VLSI Implementation of Neural Systems, Kluwer Academic Publishers, 1989.
2. Nabet, B., et. al., "Analog Implementation of Shunting Neural Networks," Neural Information Processing Systems 1, Denver, 1988.
3. Le Cun, et. al., "Handwritten Digit Recognition with a Back-Propagation Network," Neural Information Processing Systems 2, Denver, 1989.
4. Faggin, F., et. al., "Neural Network Analog VLSI Implementations.," Neural Information Processing Systems, Denver, 1991.
5. Lyon, R., "The Optical Mouse, and an Architectural Methodology for Smart Digital Sensors," CMU Conference on VLSI Systems and Computations, 1981.
6. Delbruck, T., "A Chip that Focuses an Image on Itself," Analog VLSI Implementation of Neural Systems, Kluwer Academic Publishers, 1989.
7. Van der Spiegel, J., et. al., "A Foveated Retina-Like Sensor Using CCD Technology," Analog VLSI Implementation of Neural Systems, Kluwer Academic Publishers, 1989.
8. Boahen, K., Andreou, A., "A Contrast Sensitive Silicon Retina with Reciprocal Synapses," Neural Information Processing Systems, Denver, 1991.
9. Mead, C., "Adaptive Retina," Analog VLSI Implementation of Neural Systems, Kluwer Academic Publishers, 1989.
10. Daugman, J., "Complete Discrete 2-D Gabor Transforms by Neural Networks for Image Analysis and Compression," IEEE Trans. on Acoustics, Speech, and Signal Processing, vol. 36, No. 7, July 1988.

These additional references are incorporated by reference. They are referred to by number below.

BACKGROUND OF THE INVENTION

As background for my invention it is noted that many neural networks have been implemented in integrated circuits, (1-3) for example, and that there are examples of such networks with optical inputs via photodetectors (4-9). I point out that all such networks have either had built into them the ability to be modified at will, or have a very restrictive implementation with a resistive network for calculating the Laplacian, or spatial derivative. Therefore, this prior art either has the capability I am espousing, but with a much more complicated implementation circuit and thus, consumes more integrated circuit area, or does not have the computational capability of my invention.

SUMMARY OF THE INVENTION

The improvements which I have made achieve a large increase in the amount of computation per unit time and area that can be placed in an integrated circuit for a specific computational purpose.

These improvements are accomplished by providing:

A large input bandwidth to the integrated circuit (IC) by means of an array of photodetectors that translate an image projected onto the IC surface to many analog signals that are inputs to the processing network on the IC;

A set of current sources that supply currents to internal nodes based on the signals from the photodetectors;

A summing junction for the above currents at the internal nodes of the network;

A comparator function to pass or not pass on a signal to a succeeding network layer based on whether the total current at an internal node is greater than or less than a threshold value for that node. The output of the comparator is processed into a current becomes the input to the next successive layer of the network.

Any number of layers of current generation and summation at internal nodes and comparison to a threshold at each node; and Output nodes that convey information about the state of the network versus inputs to the outside world.

Additional features of the invention are:

The computation is represented in the current sources between nodes. In order to minimize the area needed for this computation, and thus maximize the computation per unit area, these current sources are fixed values, with the values set by the specific computational tasks to be accomplished.

Current mirrors are used to further minimize the amount of circuits necessary to modify a single input signal as it passes to many nodes at the next stage. One can approach one transistor per computation with this approach.

Light images focused on the array of photodetectors permits a large input bandwidth, circumventing a classic problem of input/output pad number limitations as IC are made larger and larger.

All the necessary computation to accomplish a task is included on chip in order that the number of output pads can be reduced to further alleviate the input/output pad number limitation for large IC's.

The general effect of my invention will be to calculate multiple dot products between the image focused on the integrated circuit surface and many reference patterns built into the integrated circuit, and then give an output indication for all those reference patterns where the dot product exceeds a threshold. The threshold is externally controllable. The reference patterns are built into the design of the integrated circuit. The dot product is the sum of the individual multiplications between the voltage from the photodetector at a location and the reference value for that location. It effectively detects the presence of a pattern within the image focused on the integrated circuit surface.

That this invention can be of any value, if the reference patterns are fixed, is demonstrated in many articles discussing image analysis and compression. Daugman (10) discusses the use of Gabor functions as such basic patterns of image analysis and compression. Gabor functions are trigonometric like patterns that exist only over a limited 2 dimensional space. They may have one or many cycles of sinusoidal variation over the space, and the phase may be shifted relative to the position in the space. My example invention uses the first order Gabor functions as its internal set of reference patterns. In its simplest embodiment, the processor is simply the integrated circuit with a lens (schematically 99 in FIG. 3 to represent all input devices which I have detailed) in front of it to focus an image from the outside world onto the surface of the integrated circuit. This invention would also encompass implementations where the integrated circuit is coupled to an image source, with or without a lens. For example, the image source could be a cathode ray tube (CRT), or a photoemitter such as an array of laser or light emitting diodes, or a liquid crystal display (LCD) with light source. The lens would only be required if the image size needed to be changed or some physical limitation prevented the image source from being immediately adjacent to the integrated circuit. The advantage of having an image source such as a CRT, is that the position of the image can be moved across the integrated circuit, or the same image can be presented in multiple copies to many similar integrated circuits. This capability might prove very useful in intermediate states of development when the number of components that can be put onto a single integrated circuit chip has not yet reached a level sufficient with that required to process all possible output responses in all possible positions on the input array. The problem can be divided among many such chips, each presented with the same input image. Furthermore, the image can be moved electronically with the CRT across the input array, reducing the amount of processing required internally of the chip. Of course, one can mechanically scan an input image across the integrated circuit input array in yet another implementation.

These and other improvements are set forth in the following detailed description. For a better understanding of the invention with advantages and features, reference may be had to the description and to the drawings.

BRIEF DESCRIPTION OF THE DRAWINGS

FIGS. 2, 2A-2B show the reference patterns that are implemented in the preferred embodiment. They represent the 1st order Gabor functions, rotated in order to cover 6 possible orientations and shifted in position in order to cover 3 possible locations in the array for each orientation.

My detailed description explains the preferred embodiments of my invention, together with advantages and features, by way of example with reference to the following drawings.

DETAILED DESCRIPTION OF THE INVENTION

Before considering my preferred embodiments in detail, it may be worthwhile to illustrate, by way of example, the operation of the invention. The underlying concept is that of a current mirror, a device that can be used to reflect a current into many places simultaneously. So, an image, focused on the surface, causes a current to be generated at each photodetector. Each current, corresponding to the light intensity at a place on the image, is then reflected, via the current mirror, into many lines which then sum the total current for each internal pattern. The internal patterns (see FIG. 2) are represented by the values of the current mirrors from the individual photodetectors to the various output lines. A threshold circuit is implemented with a constant current source to ground. Thus, an output will only occur when the summed current in a line is greater than the threshold current.

The Preferred Embodiment

Figure 1:
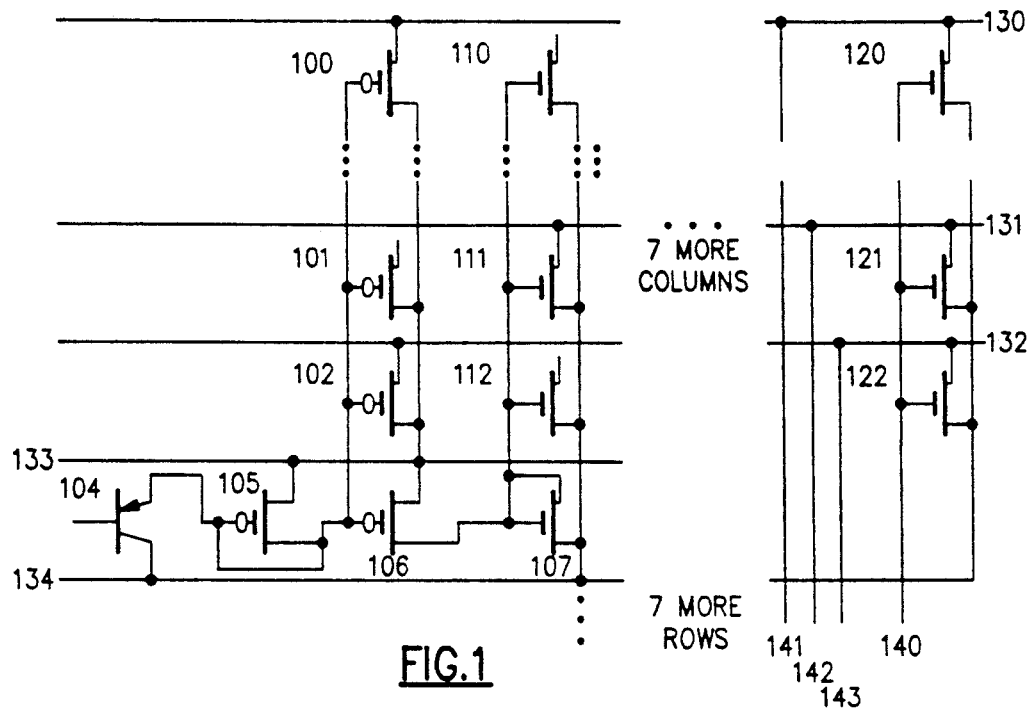
FIG. 1 shows schematically an overview of the preferred embodiment and particularly shows an 8 by 8 array of photodetectors with imbedded circuitry to detect the presence and orientation of a line of light. The width of the line of light must be equal to or greater than the spacing of two photodetectors and less than or equal to the spacing of four photodetectors. Alternative implementations can be made for other line widths and/or edges.

Turning now to my invention in greater detail, it will be seen from FIG. 1 that illustrates my preferred embodiment in which, a bipolar transistor 104 reacts to the light intensity of an image focused on the surface and supplies current to PFET 105. PFET 105 is connected with drain and gate shorted together such that the voltage between line 133, connected to a supply voltage and the drain, when connected to similar PFETS 106,100,101, and 102 will cause a positive current to flow out of those PFETS that is proportional to the relative size of the gates of those PFETS and PFET 105, into electrical lines 130,131,132 and into NFET 107, and are commonly referred to as current mirrors. NFET 107 has its gate and drain shorted such that the voltage on its source, transmitted to NFETS 110, 111, and 112 causes a negative current proportional the relative sizes of the gates with that of the gate of NFET 107, to flow into electrical lines 130, 131, and 132, and are commonly referred to as current mirrors. For the cases where the input signal is multiplied by zero, for a particular output, there is no connection from either current mirror to that line summing the current for that output. NFETS 120, 121 and 122 are biased by line 140 to control the negative current supplied to electrical lines 130, 131, and 132, such that an output indication will only occur when the current in those lines exceeds zero. The number of electrical lines 130, 131, 132 is made as large as necessary to accommodate the total number of reference patterns: for the patterns 201–206, 211–216, and 221–226 shown in FIG. 2, 18 electrical lines are needed. This schematic, less NFETS 120, 121, and 122 is repeated 7 more times in the horizontal direction, with electrical lines 130, 131 and 132 (and their extensions) connected to the PFETS and NFETS as dictated by the arrangement of values in the reference patterns. Furthermore, this extended schematic is then repeated 7 more times in the vertical direction, with the output electrical lines 130,131,132 (and their extensions) connected to the PFETS and NFETS as dictated by the arrangement of values in the reference patterns. Electrical lines 141,342, 143 (and as many as needed for all the patterns required) are used to electrically connect all the currents between the rows. Thus, each photodetector supplies one current to each output for each reference pattern, via either a PFET for positive current or an NFET for a negative current, of via no connection for zero weight, and the amount of current is determined by the relative size of the PFET or NFET relative to the PFET 105 or NFET 107, respectively. In this connection, a comparison may be made with respect to FIG. 1 and FIG. 2, wherein the additional columns and rows would be structured to provide the results shown in FIG. 2 in the circuit shown in FIG. 1.

Alternative Preferred Embodiments

The preferred embodiment uses the reference patterns 201–206, 211–216, and 221–226 shown in FIG. 2, where + means that the value of the photocurrent is passed to the electrical line with a positive sign, − means that the value of the photocurrent is passed to the electrical line with a negative sign, and 0 means that no current is passed to the electrical line.

Of course, many alternative patterns could be implemented for other purposes. And, the exact values and sizes of components can be adjusted for various reasons; lower current, more resolution, different line widths, edges, alternative patterns, etc.

Figure 3:
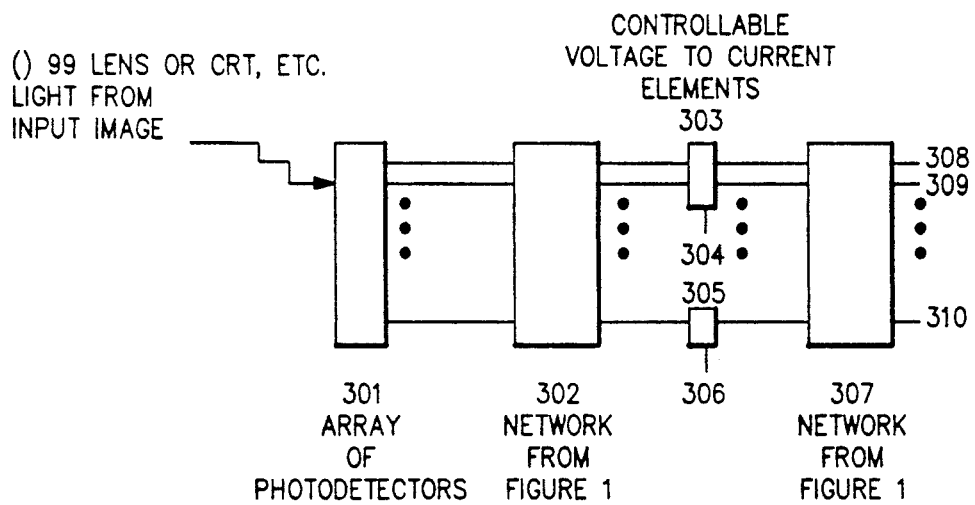
FIG. 3 shows the extension of the apparatus shown in FIG. 1 to multiple layers. This construction permits the refinement of the calculation through multiple stages. For instance, each layer would abstract information from the larger amount of information from the layer preceding it.

Furthermore, it should be apparent that one can continue this approach to extend the computation, by adding more processing layers with a similar organization of current mirrors and threshold circuits, as well as by adding more devices in the horizontal directions. An alternative implementation is demonstrated in FIG. 3. In this instance, the elements of FIG. 1, less the array of photodetectors are treated as a single element, used multiple times, as elements 302 and 307. The array of photodetectors 301, couples to the processing network 302, which then couples to a set of elements 303 and 305 that can be individually controlled by signals 304 and 306, respectively, to change the voltage output from 302 into currents that couple to processing network 307, whose outputs are 308, 309 and 310. The diagram shows dots for one of the extensions that can be made to this arrangement. This arrangement permits multiple stages of calculation.

While I have described my preferred embodiments of my invention, it will be understood that those skilled in the art, both now and in the future, may make make various improvements and enhancements which fall within the scope of the claims which follow. These claims should be construed to maintain the proper protection for the invention first disclosed.

What is claimed is:

1. Apparatus, comprising:
   at least first and second photodetectors, each of which produces an electrical signal in response to an optical signal;
   at least first and second current mirrors which are electrically connected to, respectively, said first and second photodetectors, each of said first and second current mirrors also being electrically connected to at least a first electrical output line; and
   biasing means for electrically biasing said at least first electrical output line.

2. Apparatus according to claim 1, further comprising a third current mirror interposed between, and electrically connected to, said first current mirror and said first electrical output line.

3. Apparatus according to claim 1, wherein each of said first and second current mirrors includes at least two electrically connected field effect transistors (FETs) and said biasing means includes an FET.

4. Apparatus according to claim 3, wherein each of said first and second current mirrors includes at least two electrically connected p-channel FETs and said biasing means includes an n-channel FET.

5. Apparatus according to claim 2, wherein said third current mirror includes at least two electrically connected field effect transistors (FETs).

6. Apparatus according to claim 5, wherein said third current mirror includes at least two electrically connected n-channel FETs.

7. Apparatus, comprising:
   a first plurality of photodetectors arranged in rows and columns;
   a second plurality of current mirrors, said second plurality being equal to or greater than said first plurality, each of said current mirrors being electrically connected to one of said photodetectors and to a third plurality of electrical output lines, said third plurality being represented by a number N, the electrical connections between said current mirrors and each of said N electrical output lines representing N different electrical connection patterns; and means for electrically biasing each of said N output lines.

8. Apparatus according to claim 7, wherein each of said N different electrical connection patterns corresponds to a Gabor function.

9. Apparatus according to claim 7, wherein each of said N different electrical connection patterns corresponds to a first-order Gabor function.

10. Apparatus according to claim 7, further comprising image means for producing an optical image to be impinged upon said photodetectors.

11. Apparatus according to claim 10, wherein said image means includes a cathode ray tube.

12. Apparatus according to claim 10, wherein said image means includes an array of laser diodes.

13. Apparatus according to claim 10, wherein said image means includes an array of light emitting diodes.

14. Apparatus according to claim 10, wherein said image means includes a liquid crystal display.

15. Apparatus, comprising:

at least first and second transducers, each of which produces an electrical output signal in response to an input signal;

at least first and second current mirrors which are electrically connected to, respectively, said first and second transducers, each of said first and second current mirrors also being electrically connected to at least a first electrical output line; and biasing means for electrically biasing said at least first electrical output line.

16. Apparatus, comprising:

a first plurality of transducers arranged in rows and columns, each of said transducers producing an electrical output signal in response to an input signal;

a second plurality of current mirrors, said second plurality being equal to or greater than said first plurality, each of said current mirrors being electrically connected to one of said photodetectors and to a third plurality of electrical output lines, said third plurality being represented by a number N, the electrical connections between said current mirrors and each of said N electrical output lines representing N different electrical connection patterns; and means for electrically biasing each of said N output lines.

* * * * *